Nov. 17, 1964    K. A. WHITING    3,156,976
METHOD OF MAKING COMPOSITE METAL PRODUCTS
Filed March 17, 1961    2 Sheets-Sheet 1
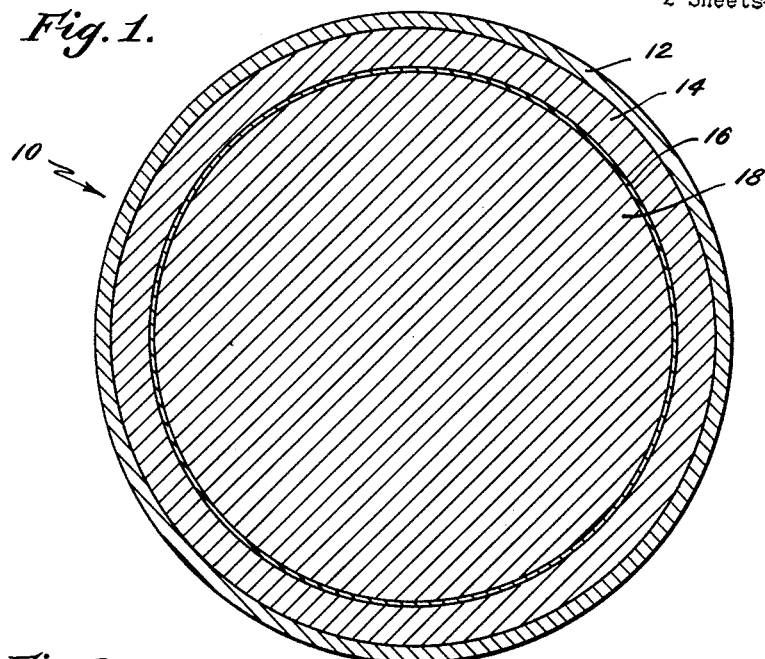
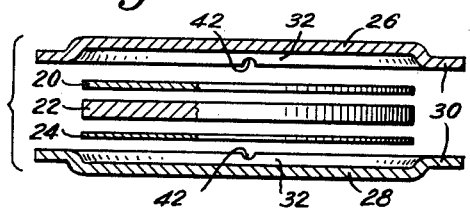
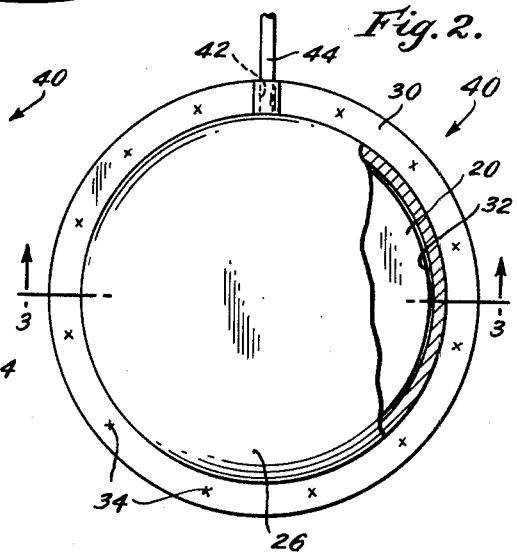
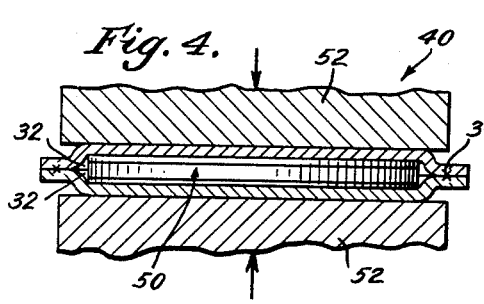
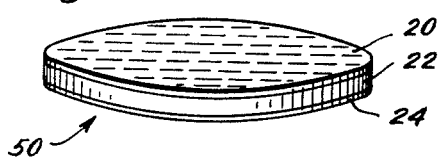
Inventor,
Kempton A. Whiting,
by Harold Levine
Att'y.

Nov. 17, 1964    K. A. WHITING    3,156,976
METHOD OF MAKING COMPOSITE METAL PRODUCTS
Filed March 17, 1961    2 Sheets-Sheet 2
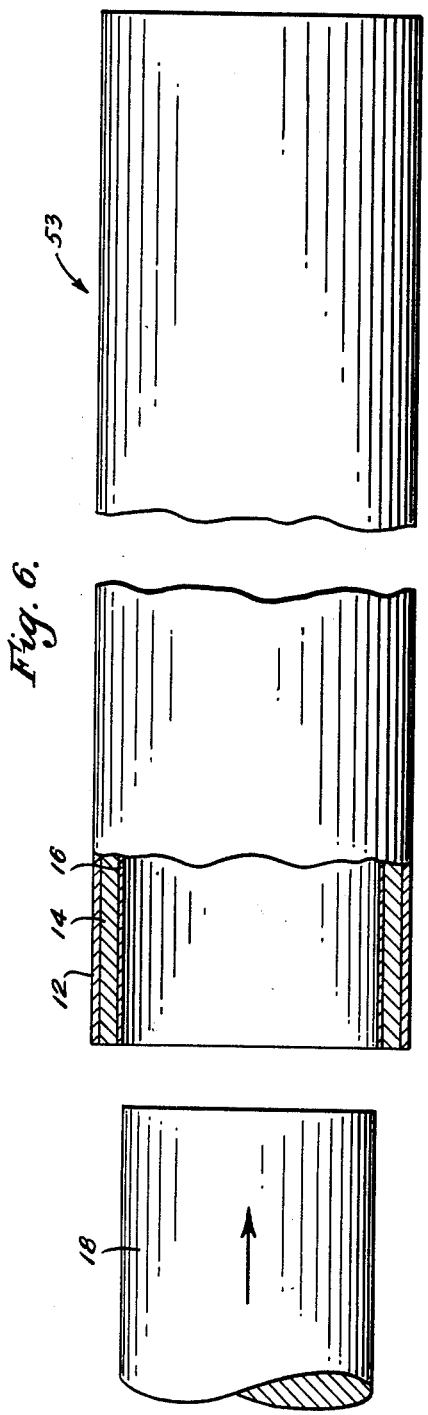
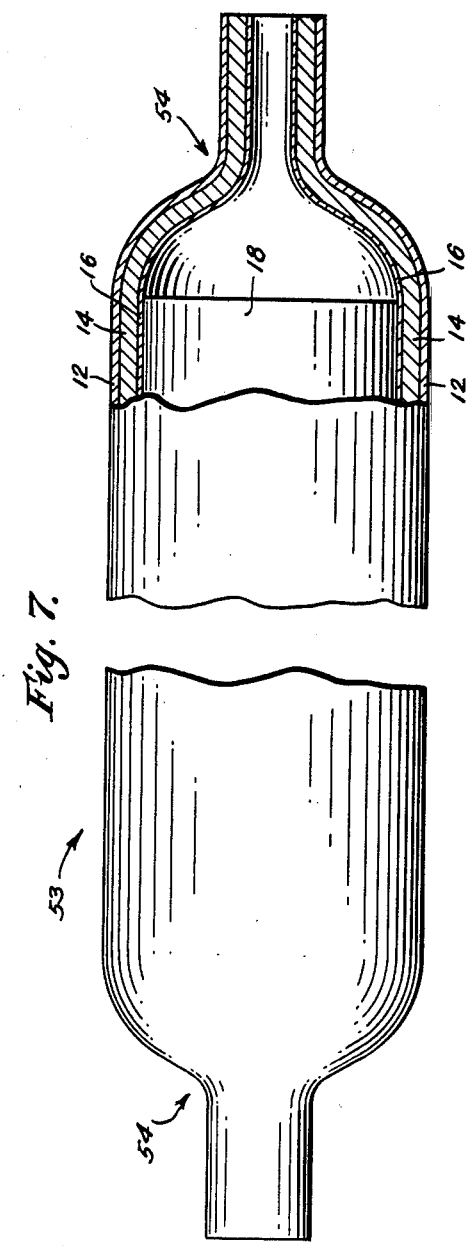
Inventor,
Kempton A. Whiting,
by Harold Levine Att'y.

United States Patent Office 3,156,976
Patented Nov. 17, 1964

3,156,976
METHOD OF MAKING COMPOSITE METAL PRODUCTS
Kempton A. Whiting, Attleboro, Mass., assignor to Texas Instruments Incorporated, Dallas, Tex., a corporation of Delaware
Filed Mar. 17, 1961, Ser. No. 96,411
5 Claims. (Cl. 29—471.5)

This invention relates to composite metal products, and with regard to certain more specific features, to composite tubular metal products including clad metal tubing and composite metal wires or rods. The composite metal products, particularly the composite wires or rods, are particularly useful as (though not limited to) electrodes for cathodic protection, and in other diverse chemical and electrochemical applications.

Among the several objects of the invention may be noted the provision of improved composite metal tubes and composite metal wires and rods, which have the required characteristics useful for electrodes in cathodic protection, wherein the product includes a relatively insoluble outer surface, and provides substantial electrical current-carrying capacity; the provision of reliable and low-cost methods for producing such composite metal tubes and wires or rods; and the provision of a method of this class which reduces the amount of scrap and labor costs involved in producing such products and which reliably provides a composite clad product having desired thicknesses and ratios of the layers forming the composite material.

Other objects and features will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which one of the various possible embodiments of the invention is illustrated:

FIG. 1 is a cross-sectional view of a finished product, according to my invention;

FIG. 2 is a top plan view showing parts of the material forming the product shown in FIG. 1, assembled in a package preparatory for bonding;

FIG. 3 is an exploded elevational view taken on line 3—3 of FIG. 2;

FIG. 4 is an elevational view of the package assembly shown in FIG. 3, shown between two members of a press;

FIG. 5 is a perspective view showing a metallurgically bonded composite product being removed from the jacket or package shown in FIGS. 2–4;

FIG. 6 is an elevational exploded view showing parts preparatory to final assembly; and FIG. 7 is an elevational view similar to FIG. 6, showing the parts in assembled relation preparatory to final completion.

Similar reference characters indicate corresponding parts throughout the several views of the drawings.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The terms "metal" or "metals" as used herein in their broad sense means malleable metals and alloys. The terms "wire" and "rod" are to be taken as equivalents. In the following description, references to conventional wire swaging and drawing apparatus and the like, have been omitted from the drawings for clarity of description.

Dimensions of certain of the parts as shown in the drawings have been modified for the purposes of clarity of illustration.

The term "composite tubular metal product" as used herein in its broad sense means hollow clad tubes, and also infilled clad tubes constituting clad wire, clad rods and the like.

In FIG. 1 is shown a preferred embodiment of my invention in the form of a composite wire, generally referred to by numeral 10, formed of a relatively thin exterior layer of platinum metal 12 surrounding and metallurgically bonded to a layer 14 formed of a metal selected from the group consisting of tantalum and niobium, which layer 14 is continuous and completely surrounds and is metallurgically bonded to a metal layer of copper 16. Copper layer 16 completely surrounds and is tenaciously adhered to an inner metal copper core 18.

Electrodes, such as used for nonsacrificial cathodic protection, are generally required to be insoluble and are required to have substantial electrical current-carrying capacity. Where the composite wire 10 is to be employed as an electrode for cathodic protection, it is important that the copper component (which may be soluble in the electrolyte in which it is immersed when in operation) be completely sealed and protected from the electrolyte or environment to which the wire is subjected. Platinum, tantalum and niobium are relatively insoluble and corrosion-resistant. Since the cost of platinum is relatively high, it is generally desirable to maintain the thickness of the platinum cladding layer to a minimum. The tantalum or niobium layer or component 14 according to the invention, is continuous and surrounds the copper layer 16 and copper core 18, and is advantageously metallurgically bonded to copper layer 16.

Where composite wire 10 is to be employed as an electrode, good low-resistance electrical current transfer between the copper core, copper layer 16, tantalum or niobium layer 14, and the platinum layer 12 is an important requirement. My invention provides these advantages as well as others, as will be clear from the ensuing description.

Referring now to FIGS. 2–4, the method according to a preferred embodiment of my invention includes the steps of providing circular discs of platinum 20, tantalum or niobium 22 and copper 24, preferably oxygen-free copper. Circular discs 20, 22 and 24 are of a thickness calculated to produce the desired percentage of thickness in the finished composite product.

Each of the discs 20, 22 and 24 are stacked and assembled with the tantalum or niobium disc 22 sandwiched between the platinum discs 20 and copper disc 24, as shown in FIG. 3. The discs assembly is then disposed between two flat flexible circular jacket-forming plates 26 and 28 (as shown in FIGS. 2–4) comprised, for example, of stainless steel. The plates 26 and 28 are embossed to form flanges, as shown at 30, and circular pockets, as shown at 32, which pockets are slightly greater in diameter than that of the disc assembly. The plates 26 and 28, after location therebetween of the disc 20, 22 and 24 to be bonded, are brought together and edge welded, as at 34, at the flanges 30 so as to provide a sealed, flexible envelope or jacket, generally referred to by numeral 40. The space afforded by pockets 32 snugly contains parts 20, 22 and 24, when the flanges 30 are welded shut.

Before insertion into the jacket 40, the parts 20, 22 and 24 are prepared as follows: Each of parts 20, 22 and 24 is preferably provided in a work-hardened, unannealed condition, although this may not be necessary in all cases. It has been found that considerably better metallurgical bonds can be achieved when such work-hardened materials are employed. Each of members 20, 22 and 24 may be work-hardened by reduction rolling with no anneals. The components 20, 22 and 24 are cut to form a substantially circular disc, each having substantially the same diameter. The interfaces to be bonded are then cleaned to remove gross contaminants and barriers to bonding, as by abrasion. The platinum component is preferably cleaned by a detergent and water rinse. The purpose of the cleaning is to remove bond deterrent materials such as oxides, grease, gross contaminants, and other barriers to bonding as explained, for example, in U.S. Patent No. 2,834,102, issued to H. R. Pflumm et al. on May 13, 1958, and assigned to the assignee of the instant application. The pockets 32 of the jacket are preferably coated with a parting material such as, for example, a thin slurry of levigated alumina, to prevent the jacket from sticking to or bonding to the adjacent plates 26 and 28. The jacket plates 26 and 28 are provided with adjacent edge notches 42 for the reception of an evacuating tube 44 welded into place when the flanges or margins 30 of the plates 26 and 28 are welded together with the contained assembly 20, 22 and 24 to be bonded.

Welding of the jacket may be accomplished with an inert tungsten arc so as not to spoil or contaminate the clean surfaces of the assembly contained therein. As contained in the closed jacket 40, the discs 20, 22 and 24 are in good interfacial contact with each other. The tube 44 is attached to a vacuum apparatus (not shown) for drawing a substantial vacuum within the welded jacket and around the parts contained therein. The tube 44 may then be pinched off to provide a static vacuum, or as is preferable, the tube may, through flexible tubing, be left in communication with a vacuum pump to produce a dynamic vacuum during subsequent operations. A 50 micron vacuum is appropriate.

Before evacuation, the tube 44 may be employed for preliminary flushing of the jacket contents with an inert gas, such as argon, but this is not always necessary. For some materials, composing the assembly and the jacket, air may be flushed out from the interior of the jacket and the jacket thereafter charged with any desired non-oxidizing substance such as helium, instead of a vacuum. It will thus be seen that in any event, an appropriate non-deleterious atmosphere to bonding is to be maintained around the contents of the jacket after welding. In most cases, the evacuating process is preferred as an appropriate atmosphere.

After the jacket or package 40 has been welded shut with cleaned and aligned cold-worked parts 20, 22 and 24 therein and evacuated, the next step in the process is to locate the jacketed assembly 40, shown in FIG. 2, between the plates or platens 52 of a press, as suggested in FIG. 4.

Platens 52 are preferably heated and may, for example, be the platens of a press, such as that disclosed in a co-pending U.S. patent application entitled "Bonding of Metals" by Gordon A. Davis et al., Serial No. 843,387, filed on September 30, 1959, now Patent No. 3,070,880.

The jacketed assembly 40 is introduced between the plates 52 of the press, preferably while the jacket and its contents are cold, or if heated, then preferably to a temperature below that of the press platens 52. Before insertion into the press, the outside of the jacket part may be provided with a suitable parting compound, such as magnesia, zirconia, alumina or graphite in a suitable suspension to prevent sticking of the plates 52 to the jacket. The press platens 52 are then moved toward one another (as suggested by the arrows in FIG. 4) with a force on the jacket to produce a suitable pressure which, when applied for an appropriate time to the jacketed assembly 40, when the latter is heated to an appropriately selected temperature, will effect a solid-phase or metallurgical bond between components 20, 22 and 24. Substantially all of this pressure is transmitted through the flexible steel jacket pieces 26 and 28, to the assembled contents in the jacket normal to the plane of the contained assembly.

The temperature, time and pressure selected are sufficient to effect a solid-phase metallurgical bond between the three plates 20, 22 and 24. It is important that the temperature be below that temperature at which brittle intermetallic compounds would form an appreciable amount. The temperature is such as to effect solid-phase bonding across adjacent interfacial surfaces (of parts 20, 22 and 24) without the production of an intervening liquid phase or the formation of undesirable intermetallic compounds in an appreciable amount. Under the stated conditions, solid-phase bonding takes place across the clean and abutting interfaces of components 20, 22 and 24 to bring about a bonded composite assembly, as shown in FIG. 5 and generally referred to by numeral 50. By way of example, I have found that a temperature of 1300° F. employed with a pressure of approximately 15 tons per square inch applied for a period of approximately 10 minutes in the example shown in FIGS. 2–4, will produce excellent metallurgical bonds between parts 20, 22 and 24.

After the heating and pressure steps, the pressure is released by opening the press, tube 44 being at this time pinched off, if not already so pinched off. The jacketed assembly is then quenched, preferably in water. Thereafter, the bonded composite assembly 50 is dejacketed and is then ready for subsequent operations, as will be described more fully below. The dejacketing may be accomplished, for example, by machining open the weld 34 by any convenient machining operation, such as shearing, sawing, milling or the like. Since the inside surfaces of pockets 32 were coated with a suitable parting compound, the bonded assembly 50 may be readily stripped from the jacket pieces 26 and 28. In some cases, adherence of the jacket pieces to the bonded assembly may be prevented merely by not cleaning the surfaces of the pockets 32 and avoiding the necessity of using a parting compound.

The bonded composite assembly 50 is then cleaned to remove traces of the parting compound applied to pockets 32. In many cases, where the cladding pieces 20, 22 and 24 are supplied in a cold-worked, unannealed condition, undesirable directionality of the material (as suggested by the dashed lines in FIG. 5) is present. The undesirable effects of directionality on the material where the latter is to be subjected to subsequent drawing operations are well known in the art.

It is preferred not to anneal the materials forming the bonded composite assembly 50 to avoid substantial diffusion which can result therefrom and avoid results of the formation of appreciable amounts of undesirable brittle intermetallic compounds. The bonded composite assembly 50 is instead subjected to a plurality of rolling passes to eliminate, or at least minimize, the effect of directionality on subsequent cupping or drawing operations. The assembly 50 is rotated and oriented differently for each rolling pass so as to equalize the directionality. Disc 50, for example, may be subjected to as many as 40 rolling passes, with the disc 50 oriented or rotated differently for each pass to effect rolling in a different direction for each of the rolling passes. During the multidirectional rolling of the composite bonded disc assembly 50 in the plurality of rolling passes, the reduction per pass is adjusted so as to maintain the shape of the bonded composite 50 in as near a perfect circle as possible.

After the rolling operation, the composite 50 is blanked to assure a substantially circular configuration. Thereafter, the composite bonded assembly blank 50 is subjected to a cupping and deep drawing operation by means well known in the art, to form the latter into a tubular shell 53, such as shown in FIG. 6. During the cupping and drawing operations to form tubular shell or tube 53, the wall thicknesses are established during drawing so that at a given tube diameter, the desired cross-section percentages of platinum, tantalum and copper will exist. The composite bonded blank 50 is cupped and drawn into a shell so that platinum layer 20, tantalum or niobium layer 22, and copper layer 24 respectively form the exterior platinum layer 12, intermediate layer 14, and interior copper layer 16, in the tubular shell, as shown in FIGS. 6 and 7, and in the finished composite wire or rod product shown in FIG. 1.

Next, the interior surface of the copper layer 16 of shell or tube 53 is cleaned, preferably by degreasing and abrading, to remove the lubricants or other matter introduced on the surface during the cupping and deep drawing operations. The purpose of the cleaning of the inner surface of copper layer 16 of the tube 53 is to remove bond deterrent materials, such as oxides, grease and other contaminants to bonding, or materials which might form a high electrical resistance barrier to current conduction between the copper core 18 and the copper layer 16.

After cleaning the interior surface of copper layer 16, a cleaned copper core having a diameter slightly less than the internal diameter of the tubular shell 53, is telescopically inserted therein. The length of copper core 18 is slightly shorter than that of the tubular shell 53. Thereafter, the open end (or both ends, if both ends are open) is swaged or necked down, as shown at 54 in FIG. 7, to nearly close the shell to retain the copper core within and to inhibit extrusion or stretch-off of copper core 18 out of the tube during subsequent swaging and drawing operations.

Thereafter, the assembly shown in FIG. 7 is subjected to further swaging and drawing operations by conventional means to further reduce the cross sectional size of the composite wire or rod to desired finish gauge, and to firmly and tenaciously adhere the copper layer 16 to the copper core 18, with a good, low-resistance electrical current-conducting connection therebetween. In many cases, the copper core will be metallurgically bonded to the copper layer 16.

Where the composite material 10 is to be employed as an electrode in a cathodic protection application, material 10 advantageously provides an excellent, low-resistance electrical current-conducting path between the copper core 18 and the exterior platinum layer 12. As pointed out above, copper core 18 is tenaciously adhered to copper layer 16, and is in good low-resistance electrically conducting contact therewith. I have found that material 10 also provides for excellent low-resistance electrical current transfer between copper layer 16 and tantalum or niobium layer 14, and also between layer 14 and exterior platinum layer 12, all of which layers are metallurgically bonded together, as described above. The composite material according to the invention advantageously provides an electrode which provides a continuous tantalum layer for sealing both the copper core and copper layer from attack by an environment to which the wire might be subjected in operation; provides an electrode having substantial current-carrying capacity; and provides a construction which permits utilization of relatively thin layers of platinum. The methods according to my invention also advantageously minimize scrap (for example, by using circular blanks) and provide for a reliable, efficient and low-cost manufacture.

The method according to my invention advantageously avoids annealing of materials and employs relatively low temperatures for bonding, thereby avoiding formation of intermetallic compounds in appreciable amounts during bonding, which compounds are often of high electrical resistance and can render the material brittle and unworkable. Further, since my method does not require subjecting the materials to high temperatures, the dangers of destruction or deterioration of the bond due to unequal expansion of the various components which might result at such elevated temperatures, are advantageously obviated.

The effectiveness of my invention has been established by, and the invention may more clearly be understood from, the following example:

A product, such as illustrated in FIG. 1, was made with the thickness of the platinum layer comprising approximately 0.25% of the cross-sectional thickness, the tantalum layer comprising 4% to 6% of the cross-sectional thickness, and the remainder of the cross-sectional thickness comprising the copper core and copper layer 16.

Flat, circular discs of platinum, tantalum and oxygen-free copper were provided with each disc 5" in diameter and in a hard-rolled or work-hardened unannealed condition. The tantalum disc was .300" thick, and the copper disc was 0.40" thick. The platinum disc was 0.016" thick and was cleaned by a detergent and water rinse. The interfaces to be bonded on the tantalum and copper discs were abraded with 80 grit $Al_2O_3$ abrasive paper. Thereafter, the discs were stacked in interfacial contact, with the platinum and copper discs sandwiching the tantalum disc therebetween. This assembly was disposed in a stainless steel jacket, such as that described above and shown in FIGS. 2–4. The pocket provided by the package was coated with a thin slurry of levigated alumina. The outer flange of the package was welded with an inert gas, tungsten arc. The package was then purged with argon and evacuated. The cold sealed package was then placed between two hot platens, which were heated to a temperature of approximately 1300° F. The vacuum in the package was held at 50 microns throughout the bonding cycle. The package, while heated to the temperature of 1300° F., was subjected to a pressure of approximately 15 tons per square inch for a period of about 10 minutes. Thereafter, pressure and heat were released, and the package was removed from the press and subjected to a water quench. The matallurgically bonded together platinum, tantalum and copper components were then removed from the jacket. Thereafter, the bonded composite was cleaned to remove the alumina parting compound. The bonded composite was then subjected to approximately 40 rolling passes, the composite bonded disc being rotated differently for each rolling pass to eliminate or at least minimize the effects of directionality. The 40 rolled passes cumulatively reduced the bonded disc assembly to a composite thickness of about .150" and cumulatively increased the diameter from 5" to approximately 7". Thereafter, the composite disc was blanked to assure circularity and a 7" diameter. The bonded blank was then cupped and drawn to 1.300" I.D. (inside diameter) by approximately .078" composite wall thickness, with the copper layer on the inside and the platinum layer as the exterior layer. A shell was then drawn to approximately 0.750" O.D. (outside diameter) and a 0.650" I.D. Thereafter, the inside of the shell (the copper surface) was cleaned by abrading. An abraded, clean, oxygen-free copper core, 0.625" in diameter and ¾" shorter than the shell, was inserted into the shell. Thereafter, the open ends were swaged to seal the copper core within the tubular shell. The composite was then swaged to provide an approximately 0.500" outer diameter. Thereafter, the swaged composite was drawn to provide a reduced outside diameter of 0.300". The platinum layer was then copper electroplated to provide a flash coat which served as a lubricant for further drawing. The composite material was then further drawn to a finished gauge of .100" outer diameter on a bull block. Thereafter, the copper plating was stripped by subjecting the composite wire to a cyanide stripper bath.

The finished product was 0.100" in outside diameter, with a platinum layer wall thickness of 0.00025", a tantalum layer wall thickness of 0.006", a copper layer wall thickness of 0.00063" and a copper core diameter of 0.0863".

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. The method of making a composite metal product comprising the steps of providing three flat clean metal components respectively of platinum, copper and one selected from the group consisting of tantalum and niobium; assembling said components so that said platinum and copper components sandwich said one component therebetween; placing said assembled components into a jacket; sealing said jacket, providing within said jacket an atmosphere which is nondeleterious to bonding; applying pressure to said assembly through said jacket; heating said assembly while under said pressure to a temperature and for a time sufficient to effect metallurgical bonding between said components without the formation of brittle intermetallic compounds in an appreciable amount; quenching said jacket and said bonded assembly; dejacketing said assembly; forming said bonded assembly into a tubular shell with said platinum component disposed exteriorly and said copper component disposed interiorly thereof; telescopically disposing a copper core within said tubular shell; and squeezing said core and shell to effect a reducttion in cross-sectional area thereof and to tenaciously adhere said copper component to said copper core.

2. The method of making a composite metal product comprising the steps of providing three flat circular clean metal layers respectively of platinum, tantalum and copper; assembling said layers so that said platinum and copper layers sandwich said tantalum layer therebetween; placing said assembled layers into a jacket; sealing the jacket, providing an atmosphere in said jacket which is nondeleterious to bonding; applying pressure to said assembly through said jacket; heating said assembly while under said pressure to a temperature and for a time sufficient to effect metallurgical bonding between said components but without the formation of a brittle intermetallic compound in an appreciable amount; quenching said jacket and said bonded assembly and dejacketing said bonded composite assembly; subjecting said bonded composite assembly to a plurality of rolling passes to eliminate or at least minimize directionality in said bonded composite; forming said bonded assembly into a tubular shell with said platinum layer forming an exterior layer thereof and said copper layer forming an interior layer thereof; telescopically disposing a copper core within said tubular shell; and squeezing said core and shell to tenaciously adhere said copper layer to said copper core.

3. The method as set forth in claim 2 and wherein said jacketed assembly is heated to a temperature of approximately 1300° F. and is subjected to a pressure of approximately 15 tons per square inch for a period of approximately 10 minutes.

4. The method of providing a composite metal product comprising the steps of providing flat, substantially circular, metal plates of platinum, copper and one selected from the group consisting of tantalum and niobium; cleaning the surfaces of said plates to be metallurgically bonded, to remove gross contaminants and barriers to bonding; stacking and assembling said plates into an assembly with said platinum and copper plates sandwiching therebetween the said one plate; locating said assembly within a jacket adapted to transfer externally applied pressure to said assembly; sealing said jacket; establishing an atmosphere in the jacket which is nondeleterious to bonding; locating said jacket in a press; heating said jacket and applying a pressure thereto, said temperature and pressure being sufficient and applied for a time sufficient to effect a metallurgical bond between said plates; said temperature being below that temperature at which brittle intermetallic compounds would form in an appreciable amount; quenching said jacket and bonded assembly therein and thereafter removing said jacket; subjecting said composite bonded assembly to a plurality of rolling passes to eliminate or at least minimize directionality in said composite assembly; coupling and drawing said composite assembly to form a tubular shell with an outer layer of platinum and an inner layer of copper; telescopically disposing a clean copper rod within said tubular shell; said copper rod being shorter than said tubular shell; and deforming at least one open end of said tubular shell to maintain said copper rod therewithin and reducing the cross-sectional area thereof with said copper layer tenaciously adhered to said copper rod.

5. The method of making a composite metal product comprising the steps of providing three clean metal components respectively of platinum, copper and one selected from the group consisting of tantalum and niobium; assembling said components so that said platinum and copper components sandwich said one component therebetween; metallurgically bonding said assembled components together to provide a bonded composite assembly; forming said bonded assembly into a tubular shell with said platinum component disposed exteriorly and said copper component disposed interiorly thereof; telescopically disposing a copper core within said tubular shell; and squeezing said core and shell to effect a reduction in cross-sectional area thereof and to tenaciously adhere said copper component to said copper core.

References Cited in the file of this patent

UNITED STATES PATENTS

| 1,956,818 | Acre | May 1, 1934 |
| 2,120,496 | Hanger | June 14, 1938 |
| 2,471,663 | Tietz | May 31, 1949 |
| 2,687,565 | Schaefer et al. | Aug. 31, 1954 |
| 2,908,966 | Wagner | Oct. 20, 1959 |
| 2,924,877 | Creutz | Feb. 16, 1960 |
| 2,945,293 | Last | July 19, 1960 |
| 2,994,125 | Hansel | Aug. 1, 1961 |
| 3,001,268 | Greer | Sept. 26, 1961 |
| 3,020,454 | Dixon | Feb. 6, 1962 |
| 3,042,428 | Gardiner | July 3, 1962 |
| 3,070,880 | Davis et al. | Jan. 1, 1963 |
| 3,096,577 | Carlson et al. | July 9, 1963 |